(12) United States Patent
Spracklen

(10) Patent No.: US 7,599,489 B1
(45) Date of Patent: Oct. 6, 2009

(54) ACCELERATING CRYPTOGRAPHIC HASH COMPUTATIONS

(75) Inventor: Lawrence A. Spracklen, Boulder Creek, CA (US)

(73) Assignee: Sun Microsystems Inc., Santa Clara, CA (US)

( * ) Notice: Subject to any disclaimer, the term of this patent is extended or adjusted under 35 U.S.C. 154(b) by 771 days.

(21) Appl. No.: 10/783,859

(22) Filed: Feb. 19, 2004

Related U.S. Application Data

(60) Provisional application No. 60/543,427, filed on Feb. 9, 2004.

(51) Int. Cl.
*H04K 1/00* (2006.01)

(52) U.S. Cl. .............................. 380/28; 712/22; 712/15; 713/161; 713/164; 703/2

(58) Field of Classification Search .................... 380/28; 712/22, 15; 713/161, 164; 703/2
See application file for complete search history.

(56) References Cited

U.S. PATENT DOCUMENTS

| | | | | |
|---|---|---|---|---|
| 4,799,181 A | * | 1/1989 | Tague et al. ................. | 708/685 |
| 5,155,820 A | * | 10/1992 | Gibson ........................ | 712/210 |
| 6,330,657 B1 | * | 12/2001 | Col et al. ...................... | 712/23 |
| 6,829,355 B2 | * | 12/2004 | Lilly ............................ | 380/28 |
| 7,103,602 B2 | * | 9/2006 | Black et al. .................. | 707/101 |
| 7,194,651 B2 | * | 3/2007 | Knee et al. ................... | 713/500 |
| 2002/0108042 A1 | * | 8/2002 | Oka et al. ..................... | 713/175 |
| 2003/0061548 A1 | * | 3/2003 | O'Gorman et al. ............ | 714/43 |
| 2005/0123140 A1 | * | 6/2005 | Feghali ........................ | 380/265 |

* cited by examiner

*Primary Examiner*—Christian LaForgia
*Assistant Examiner*—Roderick Tolentino
(74) *Attorney, Agent, or Firm*—Martine Penilla & Gencarella, LLP

(57) ABSTRACT

Provided is an apparatus and method for accelerating cryptographic hash computations. For example, in a cryptographic hash computation such as SHA-1, multiple execution units in a processor can process loosely coupled data. Specifically, after preprocessing a message with a particular bit length and parsing the padded message into multiple blocks, a first execution unit can begin processing the blocks for a message schedule computation. While the first block is processed, the first execution unit produces a partial result for the computation of the compression function in the second execution unit. By simultaneously processing the blocks on multiple execution units, the cryptographic hash computation performance can improve.

15 Claims, 9 Drawing Sheets

$W_j = M_j$ for j = 0 to 15
for j = 16 to 79
{
    $W_j$ = Rot11 ($W_{j-3}$ ⊕ $W_{j-8}$ ⊕ $W_{j-14}$ ⊕ $W_{j-16}$)
}

FIG. 8A for j = 0 to 79
{
    T = rot15(a) + $f_j$ (b,c,d) + e + $k_j$ + $w_j$
    e = d
    d = c
    c = rot130(b)
    b = a
    a = T
}
where:

| | | |
|---|---|---|
| $f_j$ (x,y,z) | = (x&y) ⊕ (~x&z) | for j = 0 to 19 |
| | = x ⊕ y ⊕ z | for j = 20 to 39 |
| | = (x&y) ⊕ (x&z) ⊕ (y&z) | for j = 40 to 59 |
| | = x ⊕ y ⊕ z | for j = 60 to 79 |

| | | |
|---|---|---|
| $k_j$ | = 0x5a827999 | for j = 0 to 19 |
| | = 0x6ed9eba1 | for j = 19 to 39 |
| | = 0x8f1bbcdc | for j = 40 to 59 |
| | = 0xca62c1d6 | for j = 60 to 79 |

FIG. 8B

```
Wj = Mj for for j = 0 to 15
for j = 16 to 63
{
    Wj = S1 (Wj-2)  +  Wj-7  +  S0 (Wj-15)  +  Wj-16
} where:

S0(x)  = Rotr7(x)  ^  Rotr18(x)  ^  Shr3(x)
S1(x)  = Rotr17(x)  ^  Rotr19(x)  ^  Shr10(x)
```

FIG. 9A

```
for j = 0 to 63
{
   T1 = h + sig1(e)  +  ch(e,f,g,)  +  kj  +  Wj
   T2 = sig0(a)  +   maj(a,b,c)
   h = g
   g = f
   f = e
   e = d + T1
   d = c
   c = b
   b = a
   a = T1  +  T2
}
where:

sig0(e)  = rotr2(e) ⊕ rotr13(e) ⊕ rotr22(e)
sig1(a)  = rotr6(a) ⊕ rotr11(a) ⊕ rotr25(a)
ch(e,f,g) = (e&f) ⊕ (~e&g)
maj(a,b,c) = (a&b)⊕ (a&c)⊕ (b&c)
```

FIG. 9B

```
Wj = mj for j = 0 to 15
for j = 16 to 79
{
    Wj = gamma1(Wj-2)  +  Wj-7  +  gamma0(tj-15)  +  Wj-16
} where:

gamma0(x) = rotr1(x) ⊕ rotr8(x) ⊕ shr7(x)
gamma1(x) = rotr19(x) ⊕ rotr61(x) ⊕ shr6(x)
```

FIG. 10A

```
for j = 0 to 79
{
    T1 = h + sig1(e)  +  ch(e,f,g,)  +  kj  +  wj
    T2 = sig0(a)  +  maj(a,b,c)
    h = g
    g = f
    f = e
    e = d + T1
    d = c
    c = b
    b = a
    a = T1 + T2
}
where:

sig0(e) = rotr28(e) ⊕ rotr34(e) ⊕ rotr39(e)
sig1(a) = rotr14(a) ⊕ rotr18(a) ⊕ rotr41(a)
ch(e,f,g) = (e&f) ⊕ (~e&g)
maj(a,b,c) = (a&b) ⊕ (a&c) ⊕ (b&c)
```

FIG. 10B

ACCELERATING CRYPTOGRAPHIC HASH COMPUTATIONS

CROSS REFERENCE TO RELATED APPLICATIONS

This application claims priority under 35 U.S.C. § 119(e) from U.S. Provisional Patent Application No. 60/543,427, filed on Feb. 9, 2004 and entitled "Accelerating Cryptographic Hash Computations," which is hereby incorporated by reference in its entirety.

BACKGROUND OF THE INVENTION

1. Field of the Invention

The present invention relates to cryptographic algorithms, and more specifically to cryptographic hash computations.

2. Description of the Related Art

Cryptographic algorithms such as cryptographic hash computations are secure one-way hash functions that take a variable-length message and produce a fixed-length hash message. The most commonly used cryptographic hash functions are the Secure Hash Algorithms (SHA), which is a U.S. Government standard known as the FIPS 180-2 secure hash standard. The FIPS 180-2 secure hash standard specifies four secure hash functions, each providing different levels of security. Most applications use SHA-1, which is a prerequisite for the Standard Performance Evaluation Corp. (SPEC) industry standard benchmark, commonly known as SPECweb99_SSL, for a Secure Sockets Layer (SSL) protocol used on secure web servers. The other three secure hash algorithms include SHA-256, which is intended as a companion for the new Advanced Encryption Standard (AES), SHA-384, and SHA-512.

The cryptographic hash computations take a message of a specified length as an input and with the use of a hash function, computes a message digest of specified length as an output. The input can include a message of up to $2^{64}$ bits for SHA-1 and SHA-256 and a message of up to $2^{128}$ bits for SHA-384 and SHA-512. The output can range from 160-bits for SHA-1 to 512-bits for SHA-512.

Cryptographic hash computations are a critical component of the processing required in many cryptographic operations. For instance, they are heavily utilized in secure web transactions and account for a significant percentage of the total processing overhead associated with SPECweb99_SSL. They are also extensively used in protocols such as Internetwork Protocol Security (IPSEC), which enable secure communication using IP.

For example, FIG. 1A is a diagram illustrating secure communication on a network using IP. A sender 110 can send a message 140 to a recipient 120 via a network connector 130. Before the message 140 leaves the sender 110, an encryption algorithm 150 processes the message 140 to produce a secure message. The secure message travels via the network connector 130 and arrives at the recipient 120 for decryption. Subsequently, the encryption algorithm 150 processes the secure message to produce the message 140.

The use of the cryptographic hash computation is shown in FIG. 1B, which is a diagram illustrating an encryption and authentication process. The encryption algorithm 150 processes the message 140 to produce an encrypted message 160. The encrypted message 160 is passed to an authentication algorithm 170 that produces a result 180 using a shared secret 165. Then, the result 180 and the encrypted message 160 are concatenated and sent to the recipient. Then, the recipient applies the cryptographic hash computation to the encrypted message 160 in order to obtain a hash number. Subsequently, the hash number is compared with the hash number transmitted with the encrypted message 160. If there is no difference, then the encrypted message 160 is authentic.

Cryptographic hash computations are computationally intensive and can consume many processor computing cycles. Specifically, the complex and repetitive computations required by the cryptographic hash computation can impact the secure network performance of a processor. To improve the performance of the processor, implementations for cryptographic hash computations have included pipelining instructions on one execution unit. However, this solution leaves other execution units in the processor idle. Thus, valuable processor computing cycles are wasted in idle execution units while only one execution unit is busy performing cryptographic hash computations.

Accordingly, what is needed is an apparatus and a method for accelerating a cryptographic hash computation on a processor and reducing wasted processor computing cycles by idle execution units.

SUMMARY OF THE INVENTION

Broadly speaking, the present invention is an apparatus and a method for accelerating cryptographic hash computations. It should be appreciated that the present invention can be implemented in numerous ways, such as a process, an apparatus, a system, a device or a method on a computer readable medium. Several inventive embodiments of the present invention are described below.

In one embodiment, a processor is capable of executing a secure hash algorithm (SHA). The processor can include a core having a first execution unit and a second execution unit, such that the first execution unit is capable of processing a message and producing a partial result passed to the second execution unit. Further, the partial result is capable of being processed by the second execution unit in parallel with the processing of the message by the first execution unit.

In another embodiment, a processor for cryptographic computation can have a first execution unit capable of performing a message schedule computation and producing a partial result, such that the partial result includes a group of bits capable of being represented by a hexadecimal value. Moreover, a second execution unit is capable of performing a compression function using the partial result, such that the second execution unit is capable of operating in parallel with the first execution unit.

Another embodiment can include a method for receiving a message and performing a cryptographic computation on the message. The cryptographic computation is capable of performing a hash computation such that the cryptographic computation includes operations for performing a message schedule computation on a first execution unit with a block of data, producing a partial result, and performing a compression function on a second execution unit with the partial result in parallel with the message schedule computation.

In an exemplary embodiment, a method for a one-way cryptographic hash computation can include processing a block in a first execution unit and producing a partial result. The method can also send the partial result to a second execution unit and process the partial result in parallel with the first execution unit.

In yet another embodiment, a computer program embodied on a computer readable medium for providing a cryptographic computation can include instructions for performing a hash computation using a first execution unit. Further included is a second execution unit, such that the first execution unit partially produces a result for parallel processing by the second execution unit.

In an embodiment for a processor, a first execution unit is capable of performing a message schedule computation and producing a partial result, wherein the partial result includes loosely coupled data capable of permitting parallel processing. Further, the processor includes a second execution unit capable of performing a compression function consuming the partial result, wherein the second execution unit is capable of operating in parallel with the first execution unit.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 8A is a diagram of instructions for a first execution unit, in accordance with an embodiment of the invention;

FIG. 8B is a diagram of instructions for a second execution unit, in accordance with an embodiment of the invention;

FIG. 9A is a diagram of instructions for a first execution unit, in accordance with another embodiment of the invention;

FIG. 9B is a diagram of instructions for a second execution unit, in accordance with another embodiment of the invention;

FIG. 10A is a diagram of instructions for a first execution unit, in accordance with yet another embodiment of the invention; and FIG. 10B is a diagram of instructions for a second execution unit, in accordance with yet another embodiment of the invention.

DETAILED DESCRIPTION OF THE PREFERRED EMBODIMENTS

The following embodiments describe an apparatus and method for accelerating cryptographic hash functions. Specifically, a processor can use multiple execution units in parallel, thereby reducing wasted processor computing cycles. In one example, accelerating the cryptographic hash computation achieves an improvement of approximately 45% in processing time. In another example, accelerating the cryptographic hash computation achieves an improvement of approximately 70% in processing time. However, any percentage improvement in processing time is possible as long as wasted processor computing cycles are reduced. It will be obvious, however, to one skilled in the art, that the present invention may be practiced without some or all of these specific details. In other instances, well known process operations have not been described in detail in order not to unnecessarily obscure the present invention.

Figure 2:
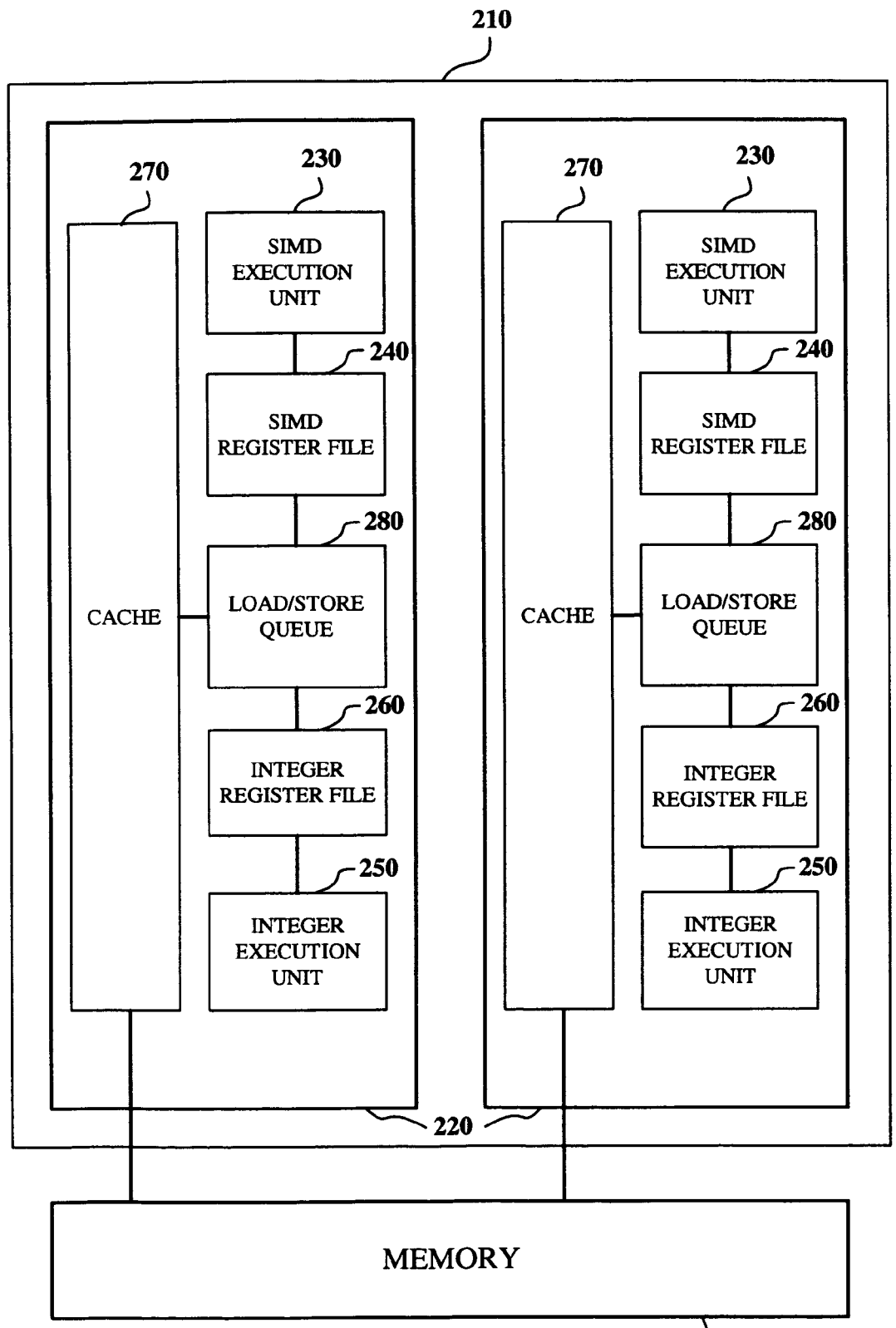
FIG. 2 is a diagram illustrating a processor, in accordance with an embodiment of the invention.

FIG. 2 is a diagram illustrating a processor 210, in accordance with an embodiment of the invention. The processor 210 can include one or more cores 220. In embodiments having more than one core, the processor can be referred to as a "multi-core" processor. Although the processor 210 is shown with two cores 220, other embodiments can include any number of cores 220. Further, two or more processors 210 connected together are capable of parallel processing. Each core 220 includes one or more single instruction multiple data (SIMD) execution unit 230, a SIMD register file 240, one or more integer execution unit 250, an integer register file 260, a cache 270, and a load/store queue 280. Moreover, the cache 270 of each core 220 can access a memory 290. Although FIG. 2 illustrates a processor 210 with connections such as the connector between the cache 270 and the memory 290, any connections internal and external to the processor 210 are possible as long as the connections facilitate the transfer of signals and the corresponding information represented by those signals.

The SIMD execution unit 230 and the integer execution unit 250 can be a first and second execution unit, respectively. In other embodiments, other execution units can be added, as long as the additional execution units are used to accelerate the cryptographic hash computation. The SIMD execution unit 230 can connect to the SIMD register file 240. Similarly, the integer execution unit 250 can connect to the integer register file 260. Both the SIMD register file 240 and the integer register file 260 provide storage capability for information, such as data, processed by the corresponding execution unit.

After processing the instructions, the results from the SIMD execution unit 230 and the integer execution unit 250 can be stored in the load/store queue 280 for transfer to the cache 270 and if necessary, the memory 290 via the cache 270. Further, the load/store queue 280 can facilitate the transfer of data between the SIMD register file 240 and the integer register file 260 similar to read after write (RAW) bypassing. In other embodiments, the SIMD register file 240 and the integer register file 260 can transfer data to one another without the use of the load/store queue 280 by using dedicated instructions. By providing the capability to transfer information between execution units, the cryptographic hash computation can be partitioned between the SIMD execution unit 230 and the integer execution unit 250. This capability accelerates the cryptographic hash computation by executing instructions for part of the hash computation on the SIMD execution unit 230 and the integer execution unit 250 in parallel.

The simultaneous execution of instructions on the execution units is possible because the computations performed on each execution unit are loosely coupled. Computations that are loosely coupled have some dependencies on one another, which require data to be communicated between execution units. However, as long as the data communication is conducted in a timely fashion, the computations can be executed simultaneously on different execution units. Specifically, there is a producer-consumer relationship between the SIMD execution unit 230 and the integer execution unit 250, and as long as the necessary data is transferred in a timely fashion from the SIMD execution unit 230 to the integer execution unit 250, both execution units can process the same block of the message in parallel. Because the data processed on the execution units is loosely coupled, a first execution unit can produce a partial result and pass that partial result to a second execution unit. Thus, while the first execution unit continues to process the data, the second execution unit can begin to process the partial result.

Figure 1A:
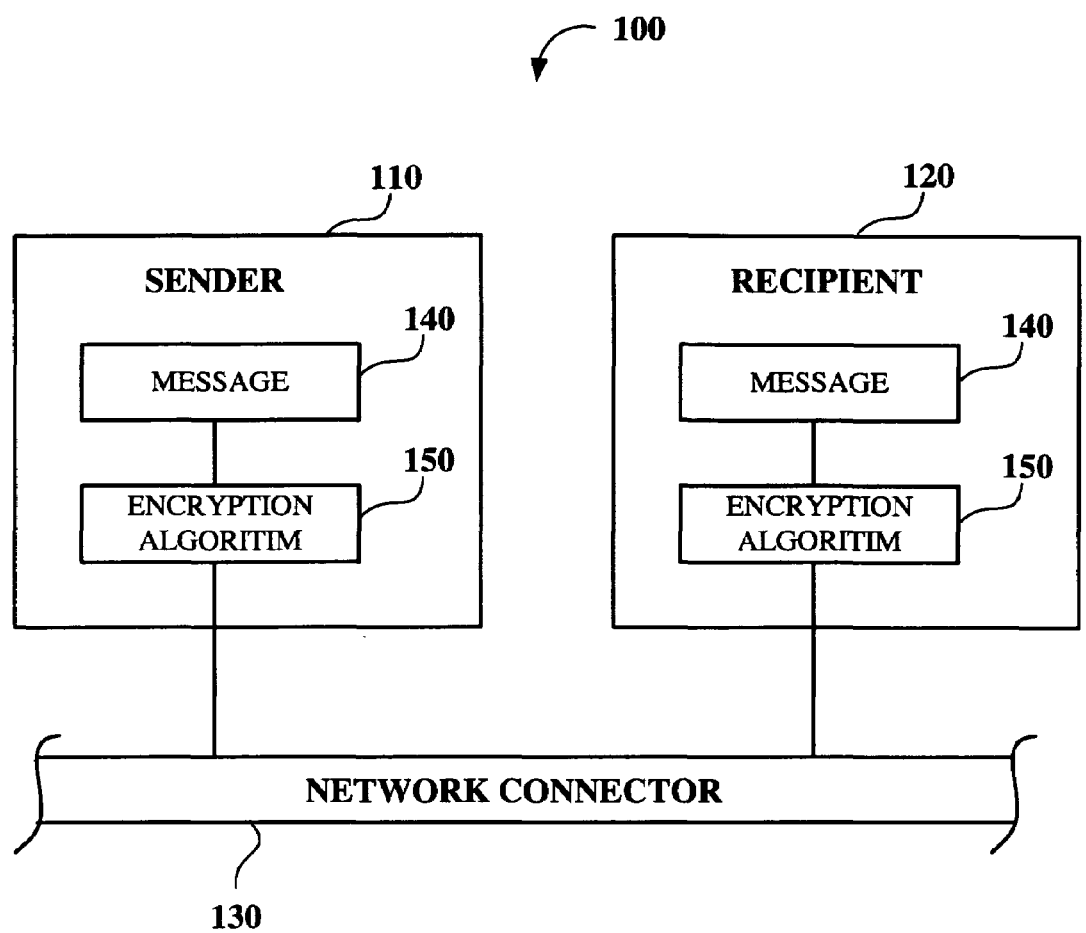
FIG. 1A is a diagram illustrating secure communication on a network.
Figure 1B:
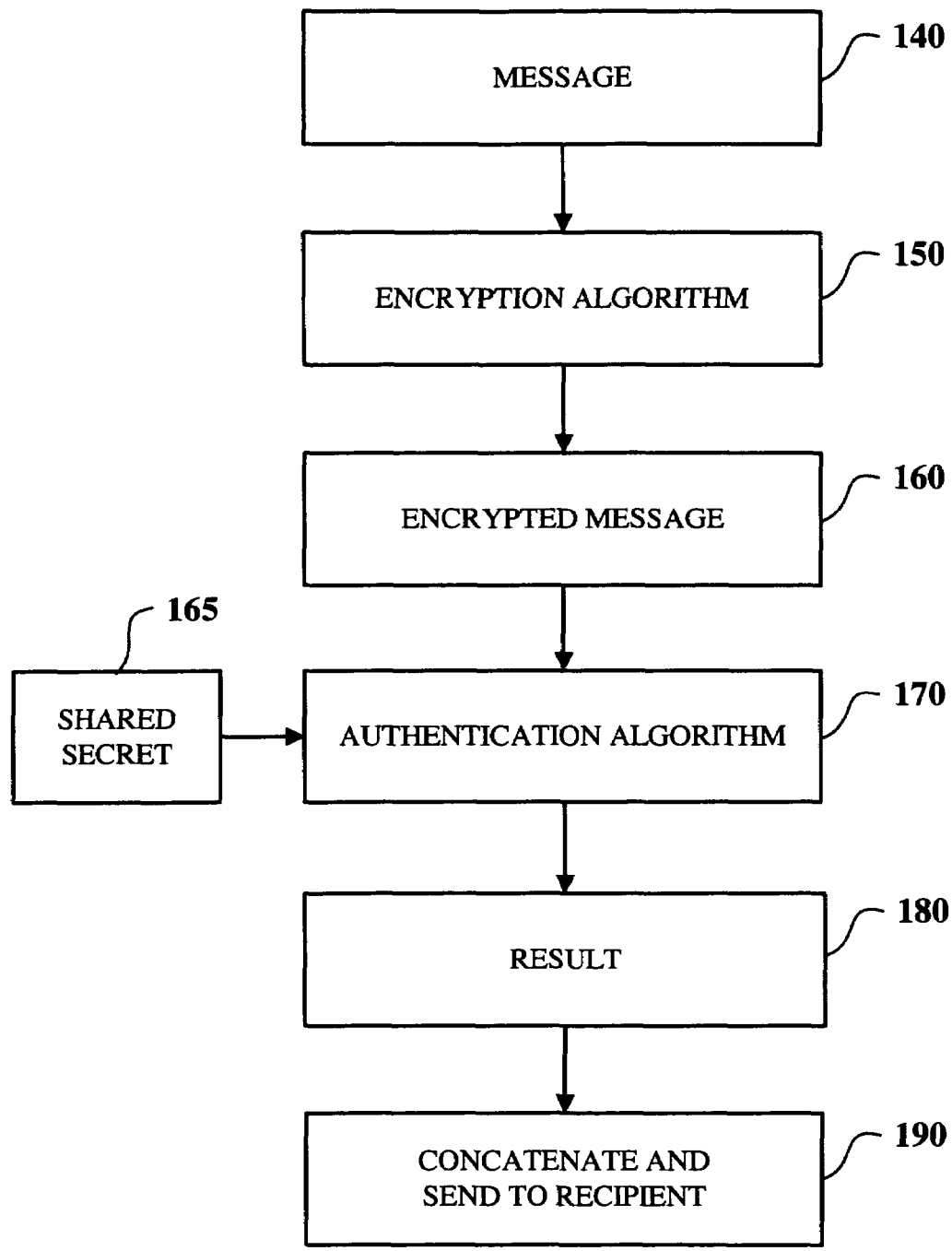
FIG. 1B is a diagram illustrating an encryption and authentication process.
Figure 3:
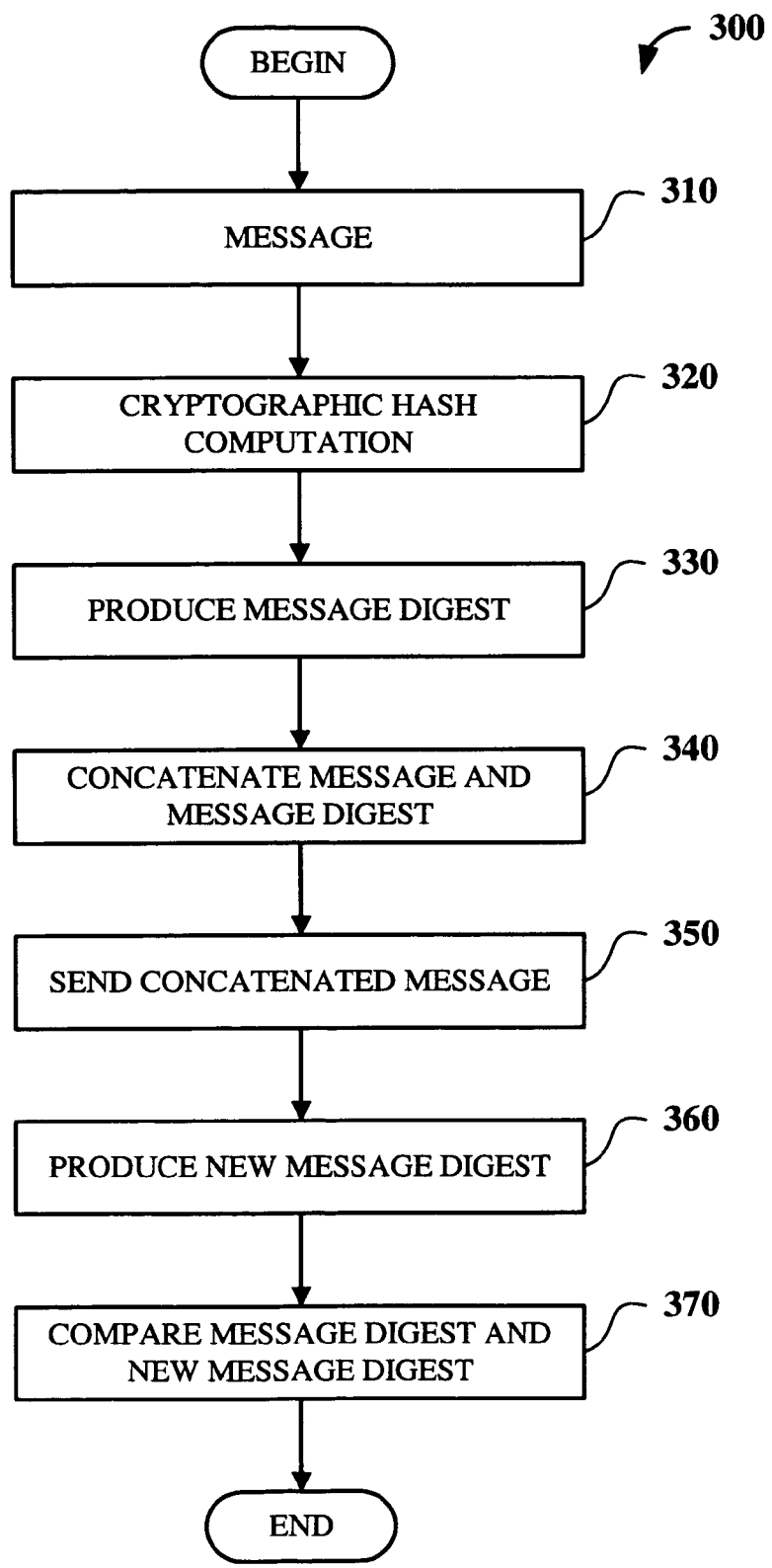
FIG. 3 is a diagram of a method of a cryptographic computation, in accordance with an embodiment of the invention.

FIG. 3 is a diagram of a method 300 of a cryptographic computation, in accordance with an embodiment of the invention. In one exemplary embodiment, software performs the method 300. The method 300 begins when the message 140 (FIG. 1) arrives for processing in operation 310. The message 140 can be a plurality of bits that correspond to the appropriate cryptographic hash computation. For example, for SHA-1, the plurality of bits in the message 140 can include a bit count of up to $2^{64}$ bits. However, in any cryptographic hash computation, any number of bits is possible, as long as multiple execution units can process the cryptographic hash computation.

Consequently, in operation 320, a cryptographic hash computation processes the message 140 to produce a message digest in operation 330. Then, in operation 340, software can concatenate the message 140 and the message digest and subsequently send the concatenated message, in operation 350. In operation 360, the authentication code produces a new message digest. For example, the authentication code can be a hash message authentication code (HMAC), as described in RFC 2042, hereby incorporated by reference. This new message digest and the message digest sent with the message are compared to determine the authenticity of the message, in operation 370. Consequently, the method 300 ends with a determination of either an authentic message or a falsified or corrupted message.

Figure 4:
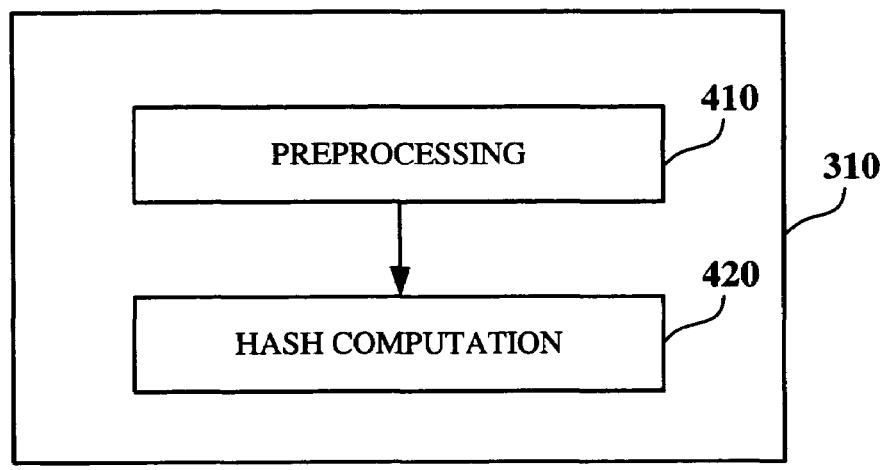
FIG. 4 is a diagram of operations in a cryptographic computation, in accordance with an embodiment of the invention.
Figure 5:
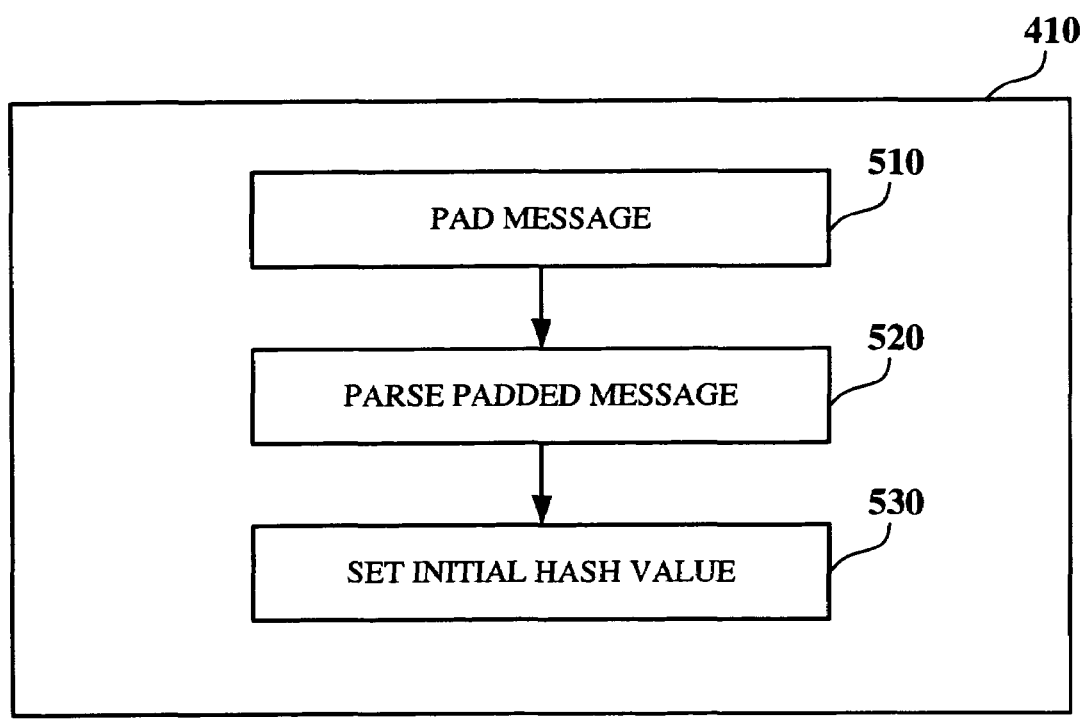
FIG. 5 is a diagram of operations in a preprocessing operation, in accordance with an embodiment of the invention.

FIG. 4 is a diagram of operations in a cryptographic computation, in accordance with an embodiment of the invention. In operation 310, preprocessing of the message 140 occurs in operation 410 and a hash computation occurs in operation 420. Correspondingly, FIG. 5 is a diagram of operations in a preprocessing operation, in accordance with an embodiment of the invention. Specifically, operation 410 can include an operation 510 to pad the message 140, an operation 520 to parse the padded message, and an operation 530 to set initial hash values. For example, in SHA-1 and SHA-256, the message 140 can be a multiple of 512 bits. In SHA-384 and SHA-512, the message 140 can be a multiple of 1024 bits. Thus, in SHA-1 or SHA-256, if the message 140 has less than the multiple of 512 bits, then the message 140 is padded at the end of the message 140 with a plurality of pad bits such as "1", a plurality of zeros, and the number of bits in the message 140 represented in binary.

Then, the padded message is parsed in operation 520. Specifically, the padded message can be partitioned into a plurality of blocks. For SHA-1 and SHA-256, each block can be represented as a group of 512 bits. For SHA-384 and SHA-512, the block can be represented as a group of 1024 bits. The group of 512 bits and the group of 1024 bits can correspond to a series of 32-bit words or 64-bit words of a processor, respectively. Further, each block can be represented as a hexadecimal value such as "efcdab50" and can also be represented as Mj such that in SHA-1 and SHA-256, there can be j 512-bit blocks.

Consequently, in operation 530, five or eight initial hash values that can also be represented as a hexadecimal value, are set. The hash values can be represented as "H" where each hash value can be represented as 32 bits or 64 bits. Although current implementations of cryptographic hash computations, such as SHA-1, SHA-256, SHA-384, and SHA-512 are represented as 512-bit and 1024-bit blocks with five or eight hash values, other embodiments can be any amount of a group of bits and can include any amount of hash values as long as the cryptographic hash computation is capable of partitioning and parallel processing on multiple execution units.

Figure 6:
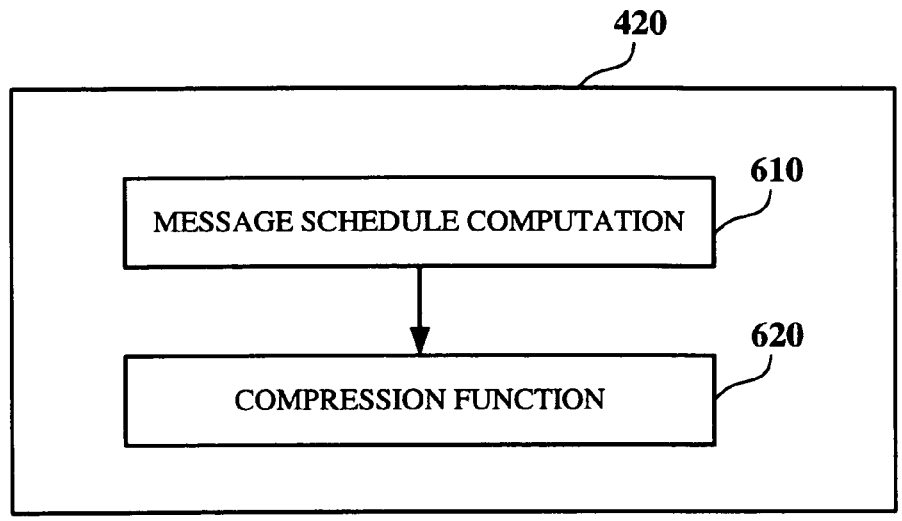
FIG. 6 is a diagram of operations in a hash computation, in accordance with an embodiment of the invention.
Figure 7:
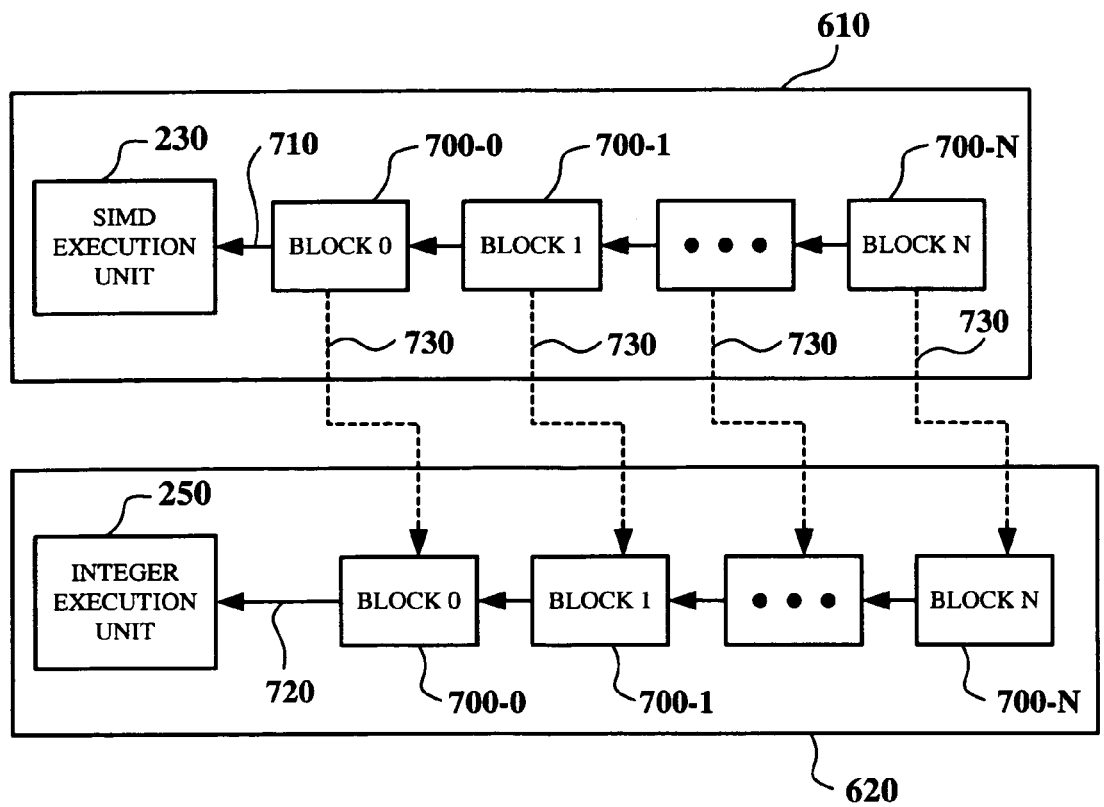
FIG. 7 is a diagram of execution units performing a hash computation, in accordance with an embodiment of the invention.

FIG. 6 is a diagram of operations for each block in a hash computation, in accordance with an embodiment of the invention. Operation 420 includes an operation 610 for message schedule computation and an operation 620 for performing a compression function that uses the results generated by the message schedule. Correspondingly, FIG. 7 is a diagram of execution units performing the hash computation, in accordance with an embodiment of the invention. Specifically, the SIMD execution unit 230 can perform the message schedule computation in operation 610 while the integer execution unit 250 can perform the compression function of operation 620, or vice versa. Thus, unlike current implementations that perform both the message schedule computation and the compression function using the integer execution units 250 or move both the message schedule computation and the compression function to the SIMD execution unit 230, the message schedule computation can be moved to the SIMD execution unit 230 while the integer execution unit 620 retains the processing of the compression function. In other embodiments, different operations of the cryptographic hash computation can be partitioned for processing by different execution units, as long as the result is the acceleration of the cryptographic hash computation.

In an exemplary operation 610, the SIMD execution unit 230 receives as input 710 a plurality of blocks such as block-0 700-0 and block-1 700-1, up to block-N 700-N where N can be the number of blocks parsed from the padded message. During processing, the SIMD execution unit 230 is capable of producing a partial result 730. Further, the partial result 730 is a group of bits that can be represented by a hexadecimal value. A plurality of partial results 730, represented as blocks, can be the input 720 to the integer execution unit 250. Accordingly, while the SIMD execution unit 230 starts and continues to process block-0 700-0 for the message schedule computation, the partial result 730 from that processing can be used to start the processing for the compression function of the block-0 700-0 in the integer execution unit 250.

Although communication between the message schedule computation and the compression function are required, the portion of the message schedule computation for a particular block can be de-coupled from the processing of the compression function of the same block. Thus, the message schedule computation for the block can be performed sufficiently far in advance to account for latencies associated with moving the partial result 730 from the SIMD register file 240 to the integer register file 260, producing minimal impact to the performance of the processor 210.

In another exemplary embodiment, the message schedule computation and the compression function can begin at the same time. For example, the SIMD execution unit 630 and the integer execution unit 250 can begin processing. When the integer execution unit 250 requires data, the integer execution unit 250 looks for the partial result 730 as input. Because the execution units began processing at the same time, the SIMD execution unit 630 should have produced the partial result 730 for the integer execution unit 650 to consume.

FIG. 8A is a diagram of instructions for a first execution unit 800, in accordance with an embodiment of the invention and FIG. 8B is a diagram of instructions for a second execution unit 850, in accordance with an embodiment of the invention. In an exemplary embodiment, the first execution unit 800 can be the SIMD execution unit 230 performing the message schedule computation and the second execution unit 850 can be the integer execution unit 250 performing the compression function. For example, for each block, the message schedule computation can expand each block into a larger message schedule. The generated message schedule, as a plurality of partial results 730, is then iteratively consumed by the compression function. For SHA-1, the compression function performs eighty iterations per block.

Thus, apart from the dependency of sharing the partial result 730 between the execution units, the message schedule computation and the compression function can process simultaneously. When processing, each execution unit is capable of instructions such as load, store, logical operations, shifts, rotations, and additions. In other embodiments, rotation and shift instructions can be emulated by addition and multiplication instructions.

For example, during the message schedule computation for SHA-1 as shown in FIG. 8A, "$W_j$" can be generated by loading the first 16 elements into "W." Thereafter, for j from 16 to 79, "Wj" can be generated by performing an exclusive-OR (XOR) operation on $W_{j-3}$, $W_{j-8}$, $W_{j-14}$, and $W_{j-16}$ followed by a left rotation by 1 bit. An exemplary left rotation by 1 bit for the binary value "11000" produces "10001." Similarly, an exemplary right rotation by 1 bit for the binary value "11000" produces "01100."

As soon as the first partial result 730 is available, which could be as soon as the SIMD execution unit 230 produces any element when j=0 through 15, the partial result 730 can be consumed and processed by the integer execution unit 250. Specifically, as shown by the compression function of SHA-1 in FIG. 8B, 80 iterations are performed using instructions such as load, store, logical operations, shifts, rotations, and additions. For example, to compute "T," which is assigned to "a" during every iteration, the previous value of "a" is left rotated by 5 bits and added to the computation of "$f_j$," "e," the constant defined for "$k_j$" and the partial result 730 represented as $W_j$. To compute $f_j$, the three values "x,y,z" are processed depending on the value of j. For example, when j ranges from 0 to 19, $f_j$ is computed by performing an AND operation on x and y, and on the logical negation of x and z. Then, the results of the AND operations are XORed.

Further, the initial values of a, b, c, d, and e are set to the initial hash values defined in operation 530. Subsequently, during each iteration of the compression function, the hash values change. Specifically, the results of the initial hash values become the inputs to subsequent blocks. After processing all the blocks of a message, the final hash values are concatenated to form the message digest in operation 330.

In another embodiment, the first 16 elements of Mj can be available for simultaneous processing by the SIMD execution units 630 and the integer execution units 650. Thus, as long as the message schedule computation produces partial results 730 as fast as the partial results 730 are consumed by the compression function, the SIMD execution units 630 and the integer execution units 650 can, not only process in parallel, but can also commence at the same time.

Moreover, FIG. 9A is a diagram of instructions for a first execution unit 900, in accordance with another embodiment of the invention and FIG. 9B is a diagram of instructions for a second execution unit 950, in accordance with another embodiment of the invention. Specifically, the message schedule computation and compression function for SHA-256 include iterations from 0 to 63 and a shift instruction. During an exemplary left shift instruction by two bits, "111000" becomes "100000." In an exemplary right shift instruction by two bits, "111000" becomes "001000." Similar to the embodiments shown in FIGS. 8A and 8B, SHA-256 as embodied in FIGS. 9A and 9B produce 32-bit words and blocks of 512-bits.

FIG. 10A is a diagram of instructions for a first execution unit 1000, in accordance with yet another embodiment of the invention and FIG. 10B is a diagram of instructions for a second execution unit 1050, in accordance with yet another embodiment of the invention. Unlike SHA-1 and SHA-256, FIGS. 10A and 10B show the message schedule computation and compression function for SHA-384 and SHA-512. Specifically, the embodiments for SHA-384 and SHA-512 produce 64-bit words and blocks of 1024-bits.

Other exemplary embodiments are possible for operations to perform the message schedule computation and hash function. Moreover, instructions to perform the operations can differ from the embodiments previously described. Accordingly, the other embodiments are possible as long as portions of a cryptographic hash computation are simultaneously processed in parallel by multiple execution units in a processor 210.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A processor for executing a secure hash algorithm (SHA) computation on a message, comprising:
a core having a first execution unit and a second execution unit, wherein an output of the first execution unit is connected to an input of the second execution unit,
wherein the first execution unit is defined to perform a message schedule computation on a data block of the message to generate an expanded representation of the data block from a first number of bits to a larger number of bits,
wherein the first execution unit is defined to communicate a partial result of the expanded version of the data block through its output to the input of the second execution unit when the partial result becomes available and prior to completion of the message schedule computation on the data block,
wherein the second execution unit is defined to perform a compression function on the partial result received from the first execution unit in parallel with the first execution unit continuing the message schedule computation on the data block, whereby the compression function is defined to iteratively consume the partial result.

2. A processor for executing a secure hash algorithm (SHA) of claim 1, wherein the first execution unit is a single instruction multiple data (SIMD) execution unit.

3. A processor for executing a secure hash algorithm (SHA) of claim 1, wherein the second execution unit is an integer execution unit.

4. A processor for executing a secure hash algorithm (SHA) of claim 1, wherein the message is a parsed padded message.

5. A processor for executing a secure hash algorithm (SHA) of claim 4, wherein the parsed padded message includes an original message and a plurality of pad bits, the original message being a plurality of bits.

6. A processor for executing a secure hash algorithm (SHA) of claim 1, wherein the partial result includes a group of bits represented as a hexadecimal value.

7. A processor for cryptographic computation, comprising:
a first execution unit defined to perform a message schedule computation on a data block and produce a partial result of the message schedule computation on the data block prior to completion of the message schedule computation on the data block, wherein the message schedule computation generates an expanded representation of the data block from a first number of bits to a larger number of bits, wherein the partial result includes a group of bits capable of being represented by a hexadecimal value, the first execution unit further defined to have an output through which the partial result is communicated; and
a second execution unit defined to have an input to which the output of the first execution unit is connected, the second execution unit defined to receive the partial result from the first execution unit through the input and to perform a compression function on the partial result while the first execution unit continues performing the message schedule computation on the data block, whereby the compression function is defined to iteratively consume the partial results.

8. A processor for cryptographic computation of claim 7, wherein the first execution unit is defined to receive a plurality of blocks, the plurality of blocks including an original message and a plurality of pad bits.

9. A processor for cryptographic computation of claim 8, wherein the first execution unit is defined to perform a rotation operation on the plurality of blocks as part of the message schedule computation.

10. A method, comprising:
receiving a message; and
performing a cryptographic computation on the message, the cryptographic computation including a hash computation including,
performing a message schedule computation on a block of data using a first execution unit, wherein the message schedule computation generates an expanded representation of the data block from a first number of bits to a larger number of bits, whereby a partial result of the message schedule computation is generated prior to completion of the message schedule computation,
communicating the partial result from an output of the first execution unit to an input of a second execution unit while the message schedule computation on the block of data continues using the first execution unit, and
performing a compression function on the partial result using the second execution unit while the message schedule computation on the block of data continues using the first execution unit, whereby the compression function is defined to iteratively consume the partial result.

11. A method of claim 10, wherein the cryptographic computation includes a preprocessing operation including,
padding the message to generate a padded version of the message;
parsing the padded version of the message; and
setting initial hash values to be used in the hash computation.

12. A method of claim 10, wherein performing the message schedule computation further includes assigning rotated bits in the block of data to the partial result.

13. A method for a one-way cryptographic hash computation, comprising:
operating a first execution unit to perform a message schedule computation on a data block to produce a partial result of the message schedule computation on the data block, wherein the schedule computation generates an expanded representation of the data block from a first number of bits to a larger number of bits;
sending the partial result through an output of the first execution unit to an input of a second execution unit while the first execution unit continues to operate to perform the message schedule computation on the block of data; and
operating a second execution unit to perform a compression function on the partial result while the first execution unit continues performing the message schedule computation on the data block, whereby the compression function is defined to iteratively consume the partial result.

14. A method for a one-way cryptographic hash computation of claim 13, wherein operating the first execution unit to perform the message schedule computation includes rotating bits in the data block.

15. A method for a one-way cryptographic hash computation of claim 13, wherein operating the second execution unit to perform the compression function includes rotating bits in the partial result.

* * * * *